United States Patent
Kushiki et al.

(10) Patent No.: US 7,567,546 B2
(45) Date of Patent: Jul. 28, 2009

(54) TRANSMITTER DEVICE, BRIDGE DEVICE, AND RECEIVER DEVICE, AND NETWORK SYSTEM INCLUDING THE DEVICES

(75) Inventors: Yusuke Kushiki, Osaka (JP); Masaaki Higashida, Osaka (JP); Kenshi Taniguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 540 days.

(21) Appl. No.: 10/577,770

(22) PCT Filed: Aug. 30, 2005

(86) PCT No.: PCT/JP2005/015718
§ 371 (c)(1),
(2), (4) Date: Apr. 28, 2006

(87) PCT Pub. No.: WO2006/027969
PCT Pub. Date: Mar. 16, 2006

(65) Prior Publication Data
US 2008/0253348 A1    Oct. 16, 2008

(30) Foreign Application Priority Data
Sep. 9, 2004    (JP)    ............... 2004-262182

(51) Int. Cl.
*H04J 3/00*    (2006.01)
(52) U.S. Cl. .................. 370/345; 370/350; 370/401; 370/310.1; 370/338; 455/502; 455/517; 455/412.1; 455/414.1
(58) Field of Classification Search .................. 370/345, 370/401, 519; 455/414.1, 412.1, 3.01
See application file for complete search history.

(56) References Cited

U.S. PATENT DOCUMENTS 5,022,024 A * 6/1991 Paneth et al. ................ 370/334

(Continued)

FOREIGN PATENT DOCUMENTS

| JP | 11-88305 A | 3/1999 |
|---|---|---|
| JP | 2001-223716 A | 8/2001 |
| JP | 2002-252604 A | 9/2002 |
| JP | 2003-259365 A | 9/2003 |
| JP | 2004-129009 A | 4/2004 |
| WO | WO 01/56220 A1 | 8/2001 |

OTHER PUBLICATIONS

European Search Report issued in European Patent Application No. EP 05 78 1482, mailed Nov. 6, 2008.

*Primary Examiner*—Sharad Rampuria
(74) *Attorney, Agent, or Firm*—McDermott Will & Emery LLP

(57) ABSTRACT

A network system includes a transmitting apparatus; a transmission path; a relaying apparatus that receives real time information transmitted through the transmission path; a wireless network; and a receiving apparatus that receives data transmitted through the wireless network. The relaying apparatus has a reference time generating part that generates a reference time independently of the transmitting apparatus; and a network transmitting part that transmits both the real time information received from the transmitting apparatus and the reference time via the wireless network. The receiving apparatus has a network receiving part that receives the real time information and reference time transmitted through the wireless network; an internal time management part that generates an internal time from the reference time received by the wireless network receiving part; and a real time information processing part that decodes the real time information received by the wireless network receiving part to reproduce the content data and that then outputs the content data, based on the internal time generated by the internal time management part. This network system allows the receiving apparatus to synchronize and output video and audio, regardless of singularity or plurality of the receiving apparatus.

7 Claims, 5 Drawing Sheets

U.S. PATENT DOCUMENTS

| | | |
|---|---|---|
| 5,640,388 A | 6/1997 | Woodhead et al. |
| 5,668,601 A * | 9/1997 | Okada et al. ............ 375/240.25 |
| 5,778,218 A * | 7/1998 | Gulick ........................ 713/503 |
| 5,966,387 A * | 10/1999 | Cloutier ...................... 370/516 |
| 6,363,412 B1 * | 3/2002 | Niwa et al. .................. 709/203 |
| 6,414,971 B1 * | 7/2002 | James et al. ................. 370/519 |
| 6,847,826 B1 * | 1/2005 | Wesby et al. ................ 455/502 |
| 6,940,831 B1 * | 9/2005 | Omi et al. ................. 370/310.1 |
| 6,965,770 B2 * | 11/2005 | Walsh et al. ............. 455/426.1 |
| 7,127,489 B2 * | 10/2006 | Aho ............................ 709/206 |
| 7,139,225 B2 * | 11/2006 | Farmer ......................... 368/46 |
| 7,162,241 B2 * | 1/2007 | Kim et al. ................. 455/435.2 |
| 7,263,076 B1 * | 8/2007 | Leibovitz et al. ............ 370/310 |
| 7,352,712 B2 * | 4/2008 | Edwards et al. ............. 370/310 |
| 2002/0032019 A1 * | 3/2002 | Marks et al. ................ 455/414 |
| 2002/0186716 A1 * | 12/2002 | Eidson ........................ 370/503 |
| 2003/0190139 A1 * | 10/2003 | Ishiguro et al. ............... 386/46 |
| 2004/0087269 A1 * | 5/2004 | Edge et al. ................. 455/11.1 |
| 2004/0092250 A1 * | 5/2004 | Valloppillil .............. 455/412.1 |

* cited by examiner

TRANSMITTER DEVICE, BRIDGE DEVICE, AND RECEIVER DEVICE, AND NETWORK SYSTEM INCLUDING THE DEVICES

RELATED APPLICATIONS

This application is the U.S. National Phase under 35 U.S.C. 371 of International Application No. PCT/JP2005/015718, filed on Aug. 30, 2005, which in turn claims the benefit of Japanese Application No. 2004-262182, filed on Sep. 9, 2004, the disclosure of which Applications are incorporated by reference herein.

TECHNICAL FIELD

The present invention relates to a transmitter device, bridge device, and receiver device for transmitting and receiving data requiring a real-time property, and to a network system including them.

BACKGROUND OF THE INVENTION

In transportation facilities for tourists, such as an airplane, a receiver device is provided at each of passenger seats in the facilities for providing various services, such as videos (e.g. movies and satellite broadcasting), audios (e.g. music and news), and interactive contents (e.g. games and shopping). These services are provided by connecting a server storing the videos, audios, and interactive contents to deliver them to each of the passenger seats via a transmission network with communications using various network technologies (e.g. streaming technologies, and file transfer protocols).

A movie service particularly in these services provides the audios supplied from each seat, and the visuals supplied from a large screen on a wall. To provide this service, both of a receiver device at each seat for outputting the audios and a projector for projecting the visuals on the wall necessarily have internal time synchronized with each other and output the visuals and audios at the same timing.

In order to provide this service, the internal time of the receiver devices, which is generally asynchronous with each other, are necessarily synchronized with each other. However, in a wired network, routing or other processes in the transmission line may cause time-series random time delay variations, hence preventing a synchronous system using this route from having accurate synchronization.

Japanese Patent Laid-Open Publication No. 2004-129009 discloses a conventional technology for synchronizing the internal time of plural receiver devices with each other. This technology utilizes a reference frequency transmitted from a satellite so as to synchronize the internal time of a transmission source with the internal time of the receiver devices. Japanese Patent Laid-Open Publication No. 11-88305 discloses a method of synchronizing the internal time by delivering reference time via another route, such as satellite communication, causing no delay variation. Alternatively, a network time protocol (NTP) can synchronize the internal time on wired network technologies, such as IEEE802.3 series, or wireless network technologies, such as IEEE802.11 series.

The method disclosed in Japanese Patent Laid-Open Publication No. 2004-129009 requires a large system, such as a satellite, and a communication route just for synchronizing the time other than those for transmitting the visuals and audios.

The method disclosed in Japanese Patent Laid-Open Publication No. 11-88305 requires a large system, such as a satellite, and dedicated circuits.

Systems on the NTP may cause variations in delay time particularly with using bridge devices, hence not ensuring synchronization. Further, the plural receiver devices request NTP timestamps from few NTP servers, thus causing congestion.

SUMMARY OF THE INVENTION

A network system includes a transmitter device, a transmission line, a bridge device for receiving real-time data, a wireless network, and a receiver device for receiving data transmitted via the wireless network. The bridge device includes a reference time generator for generating a reference time independently from the transmitter device, and a network transmitting unit for transmitting, via the wireless network, the reference time and real-time data received from the transmitter device. The receiver device includes a first network receiving unit for receiving the real-time data and the reference time transmitted via the wireless network, a first internal time controller for generating an internal time based on the reference time received by the first network receiving unit, and a real-time data processor for decoding the real-time data received by the first network receiving unit as to reproduce the contents data, and outputting the reproduced contents data based on the internal time generated by the internal time controller.

This network system allows the receiver device to output visuals and audios synchronized with each other even if including plural receiver devices.

REFERENCE NUMERALS

1 Transmitter Device
11 Network Receiving Unit (Second Network Receiving Unit)
12 Internal Time Controller (Second Internal Time Controller)
13 Controller
14 Transmission-Line Transmitting Unit
2 Bridge Device
21 Transmission-Line Receiving Unit
22 Controller
23 Reference Time Generator
231 Internal Time Counter
232 Reference Time Supplier
234 Internal Time Generator 235 Internal Time Updater
24 Network Transmitting Unit
3 Receiver Device
31 Network Receiving Unit (First Network Receiving Unit)
32 Internal Time Controller (First Internal Time Controller)
321 Reference Time Extractor
322 Internal Time Updater
323 Internal Time Counter
33 Real-Time Data Processor
331 Extractor
332 Buffer
333 Decoder
41 Transmission Line
42 Wireless Network
501 Reference Time (First Reference Time)
502 Modified Reference Time (Second Reference Time)

DETAILED DESCRIPTION OF PREFERRED EMBODIMENTS

Exemplary Embodiment 1

Figure 1A:
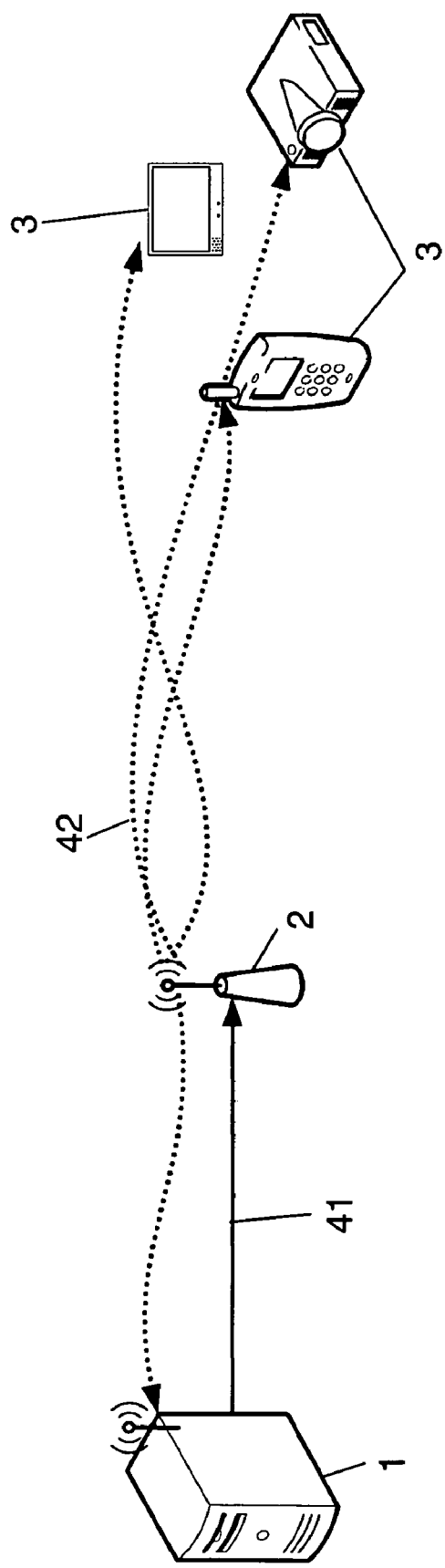
FIG. 1A is a schematic diagram of a network system in accordance with a Exemplary Embodiment 1 of the present invention.

FIG. 1A is a schematic diagram of a network system in accordance with Exemplary Embodiment 1 of the present invention. In this system, contents data, such as visuals and audios, are transmitted, received, and decoded, so that the visuals and audios are output. In other words, the contents data requires real-time property, and contained in real-time data. This network system includes transmitter device 1 for transmitting the real-time data, bridge device 2 for receiving the real-time data transmitted from transmitter device 1 and transmitting the data, receiver devices 3 for receiving the real-time data transmitted from the bridge device, transmission line 41 for transmitting the real-time data transmitted from transmitter device 1, and wireless network 24 for transmitting the data transmitted from the bridge device. The network system generally includes plural receiver devices 3, but may include single receiver device 3.

In the network system according to Embodiment 1, the IEEE802.3 series standard is applied to transmission line 41, and IEEE802.11 series standard is applied to wireless network 42. The Motion Picture Experts Group (MPEG) standard, and a real-time transport protocol (RTP), i.e. request for comments (RFC) 3350 recommended by Internet Engineering Task Force (IETF) are applied to the real-time data. For example, the real-time data may be RTP-compliant packets each having a MPEG transport stream (TS) stored in a payload of each packet. In this MPEG TS, data containing visuals and audios compressed according to the MPEG standard are stored.

Figure 1B:
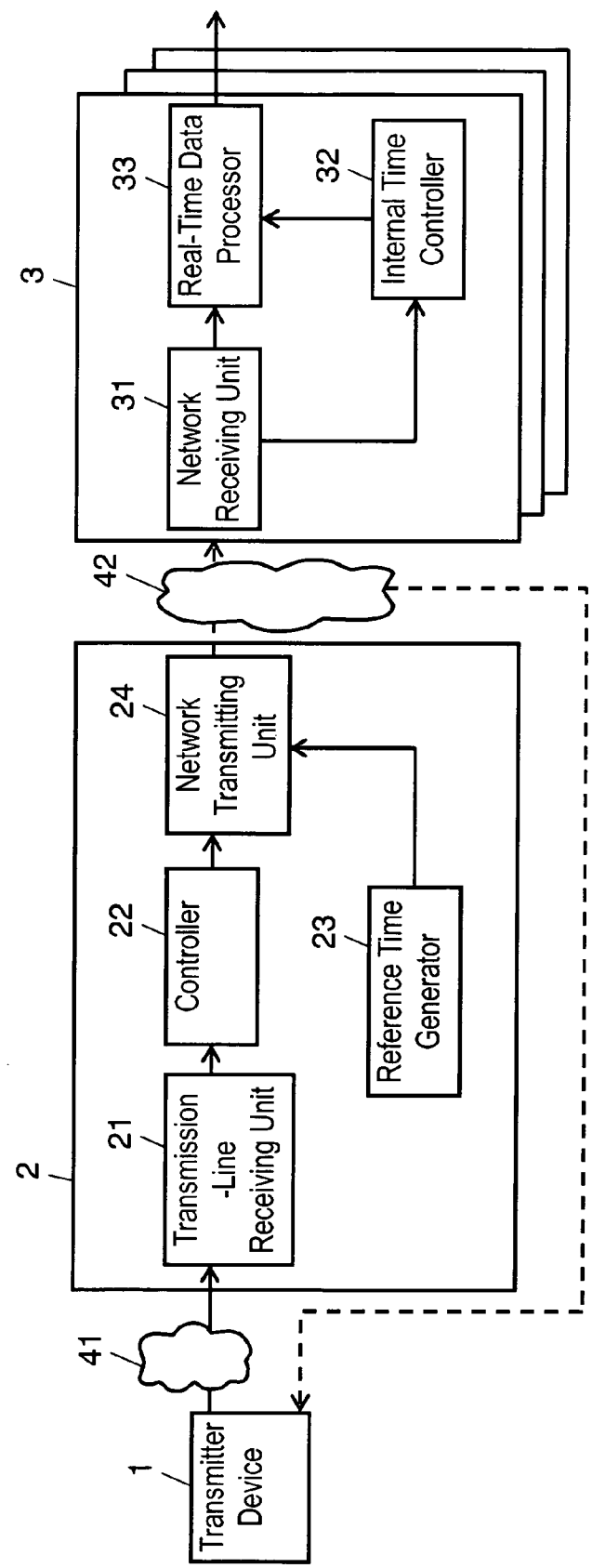
FIG. 1B is a block diagram of a bridge device and receiver devices providing the network system shown in FIG. 1A.

FIG. 1B is a block diagram of bridge device 2 and receiver devices 3 providing the network system shown in FIG. 1A.

Bridge device 2 includes transmission-line receiving unit 21, controller 22, reference time generator 23, and network transmitting unit 24. Transmission-line receiving unit 21 receives real-time data from transmission line 41. Controller 22 modifies the received real-time data and broadcasts the data from network transmitting unit 24 to receiver devices 3. Reference time generator 23 generates a reference time, a reference of the entire system, independently from transmitter device 1, and broadcasts the reference time by network transmitting unit 24 to receiver devices 3.

The reference time is in the MPEG TS packet. This MPEG packet is stored in a payload of the RTP packet. Bridge device 2 includes a system time clock (STC) as its internal time. A program clock reference (PCR) calculated based on the STC is stored in an adaptation field in a header of the MPEG TS Alternatively, the reference time can be generated by a method according to a network time protocol (NTP). In this case, the reference time to be transmitted is absolute time based on the NTP server.

Each receiver device 3 includes network receiving unit 31, internal time controller 32, and real-time data processor 33. Network receiving unit 31 receives the real-time data and the reference time from bridge device 2 via wireless network 42. Internal time controller 32 updates an internal time of receiver device 3 based on the received reference time. Real-time data processor 33 reproduces the real-time data received by network receiving unit 31. At this moment, referring to the internal time controlled by internal time controller 32, real-time data processor 33 outputs the contents data based on a presentation time described in the real-time data.

The presentation time is specified by a presentation timestamp (PTS) in a packetized elementary stream (PES) stored in the data field of the MPEG TS packet. In general, a PTS of the same value is added to visual data and audio data, such as video services which are synchronized to each other, that is, which are to be output simultaneously. Receiver device 3 has a system time clock (STC) for an internal time of the receiver device. When the value of the STC is incremented to the value of the PTS, the visuals and audios having the PTS added to the visuals and audios are supplied.

Figure 2:
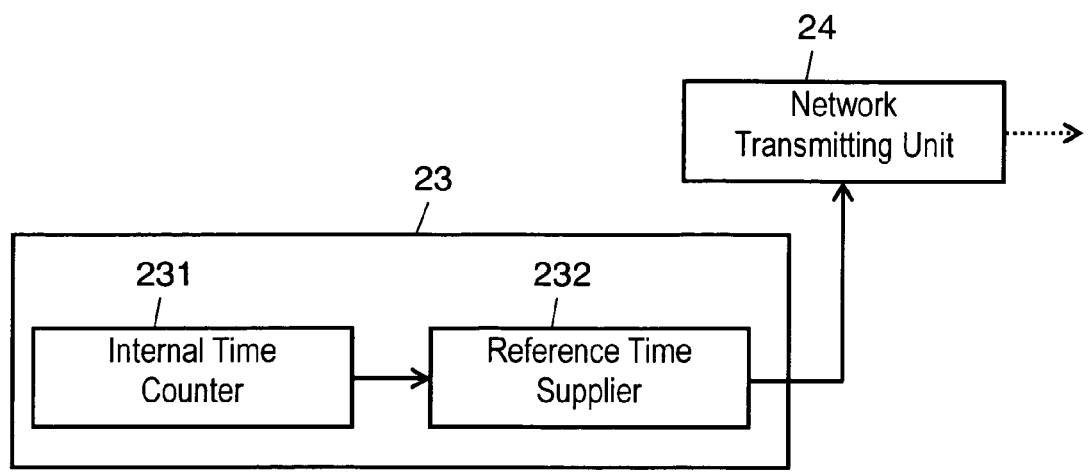
FIG. 2 is a block diagram of a reference time generator and a controller of the bridge device in the network system in accordance with Embodiment 1.

FIG. 2 is a block diagram of reference time generator 23 of bridge device 2. Reference time generator 23 includes internal time counter 231 and reference time supplier 232. Internal time counter 231 increments the internal time according to a predetermined frequency. Reference time supplier 232 adds, to the internal time, the time from the reading of the internal time to the outputting of the reference time, and transmits the resultant time via network transmitting unit 24 as the reference time.

Figure 3:
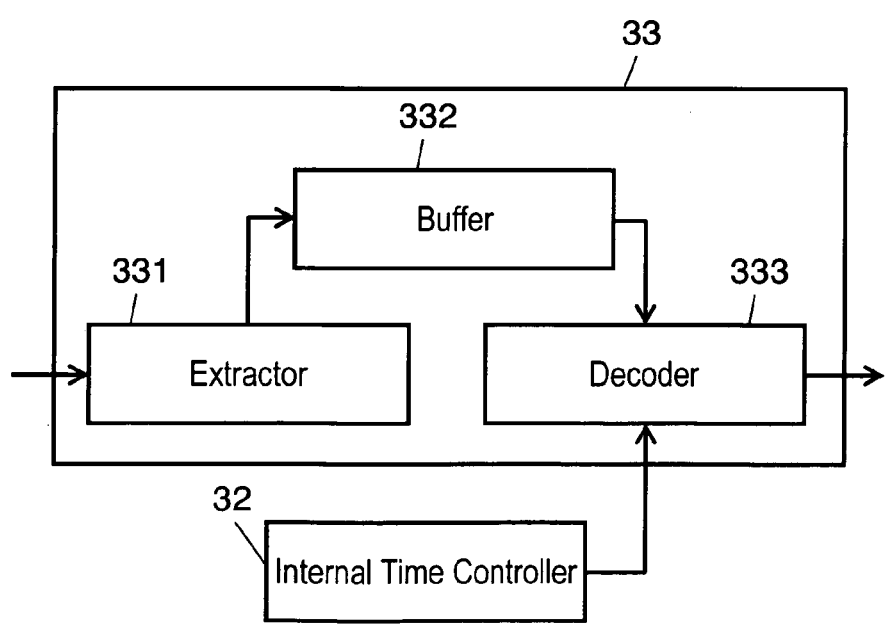
FIG. 3 is a block diagram of a real-time data processor of the receiver device in the network system in accordance with Embodiment 1.

FIG. 3 is a block diagram of real-time data processor 33 of receiver device 3. Real-time data processor 33 includes extractor 331, buffer 332, and decoder 333. Extractor 331 extracts the contents data, such as visuals and audios, from the received real-time data. According to requirement, buffer 332 temporarily stores the extracted contents data, and outputs a required amount of the data. In order to absorb delay time variations of the real-time data through the transmission line, buffer 332 has a storage capacity enough to absorb the variations. The capacity may be derived from the average or maximum of delay time. Decoder 333 decodes data supplied from buffer 332, and reproduces visuals and audios for output the data.

Figure 4:
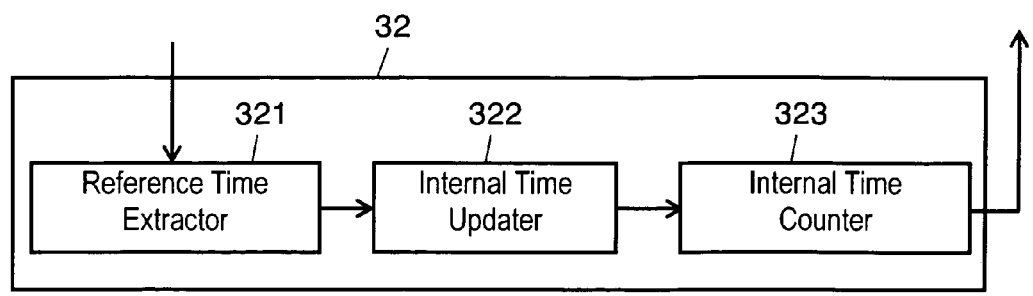
FIG. 4 is a block diagram of an internal time controller of the receiver device in accordance with Embodiment 1.

FIG. 4 is a block diagram of internal time controller 32 of receiver device 3. Internal time controller 32 includes reference time extractor 321, internal time updater 322, and internal time counter 323. Reference time extractor 321 extracts the reference time from the received RTP packet. Internal time updater 322 updates the internal time of receiver device 3 based on the extracted reference time. Internal time counter 323 increments the updated internal time according to a predetermined frequency.

Figure 5:
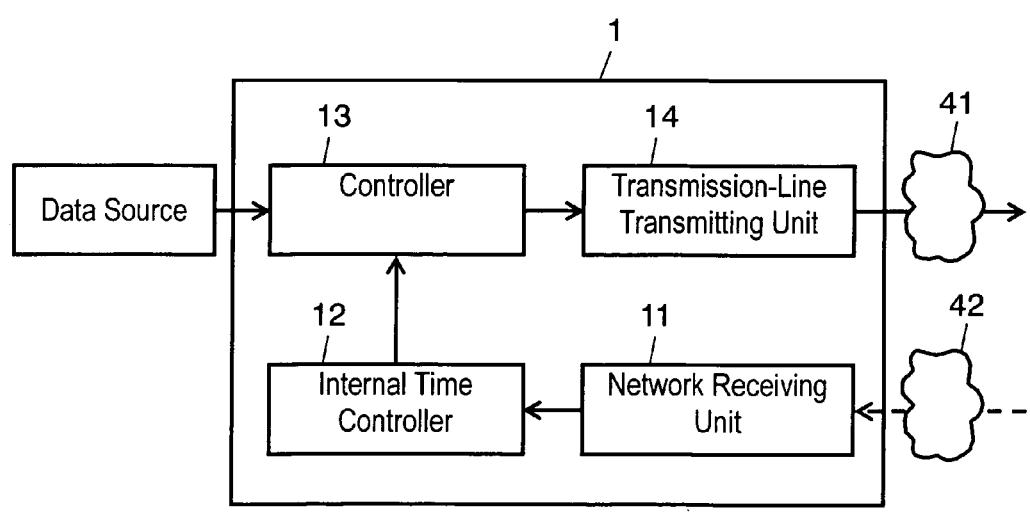
FIG. 5 is a block diagram of the transmitter device in the network system in accordance with Embodiment 1.

FIG. 5 is a block diagram of transmitter device 1. Transmission line 41 connected between bridge device 2 and transmitter device 1 may be any transmission line, such as a wireless transmission line or a local bus, or PCI. Transmitter device 1 includes controller 13, transmission-line transmitting unit 14, network receiving unit 11, and internal time controller 12. Network receiving unit 11 receives the reference time from bridge device 2. Internal time controller 12 updates an internal time of transmitter device 1 based on the received reference time. Controller 13 calculates a presentation time based on the updated internal time, adds the calculated presentation time to original real-time data containing the contents data, and generates real-time data to be transmitted. Transmission-line transmitting unit 14 transmits the real-time data including the added presentation time to bridge device 2.

In transmitter device 1, a presentation timestamp (PTS), i.e. the presentation time, is generated. Since the system time clock (STC), the internal time of receiver device 3, is synchronized with the PTS, the audios and visuals output from all receiver devices 3 receiving the real-time data from bridge device 2 are synchronized with each other.

As described above, the network system according to Exemplary Embodiment 1 performs synchronization through wireless communication with using a small system including bridge device 2 and without using a large system, such as a satellite. Any other techniques may be used instead of this technique if they have the above feature.

In general, in a wired network, routing or other processes in a transmission line may cause random time delay variations. When the data, such as audios and visuals, requiring a real-time property, is output, the variations produce difference in the timing of the outputting of the data.

When data are broadcasted to plural receiver devices in a wired network, the data are sequentially copied at nodes along each path in a switching hub corresponding to the bridge device. This causes plural reference time to be sequentially transmitted, thus preventing the plural receiver devices from receiving the reference time simultaneously. Consequently, the plurality of receiver devices does not synchronize with one another completely.

In contrast, when the data are broadcasted to the plural receiver devices on the wireless network, the data containing the reference time are transmitted from a single antenna all together at a wireless access point corresponding to the bridge device. Therefore, within a range capable of wireless connection, the plural receiver devices can receive the reference time simultaneously, and can be synchronized easily with each other.

Visuals and audios may be synchronized with each other by various methods, such as addition of a timestamp indicating an output time. When the internal time of each receiver device is synchronized with each other, these methods allow each receiver device to output the visuals and audios simultaneously.

Exemplary Embodiment 2

Figure 6:
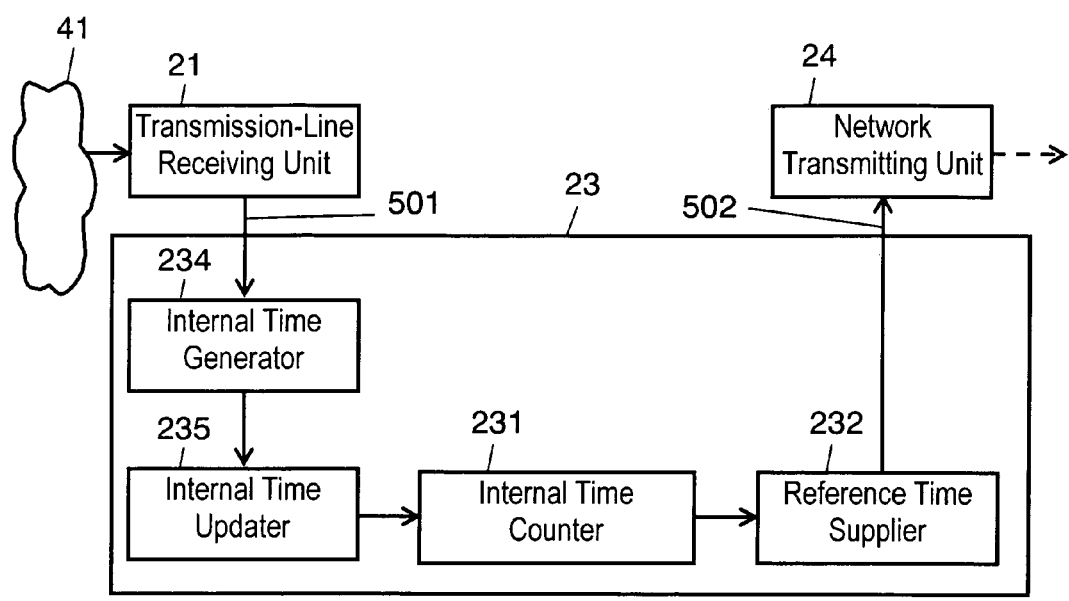
FIG. 6 is a block diagram of a reference time generator of a bridge device in a network system in accordance with Exemplary Embodiment 2 of the invention.

FIG. 6 is a block diagram of reference time generator 23A of a bridge device in accordance with Exemplary Embodiment 2 of the present invention. A network system of Embodiment 2 includes reference time generator 23A instead of reference time generator 23 of bridge device 2 in the network system of Embodiment 1 shown in FIGS. 1 to 5. The other elements are the same as those of the network system of Embodiment 1, and their descriptions will be omitted.

Reference time generator 23A includes internal time generator 234, internal time updater 235, internal time counter 231, and reference time supplier 232.

Internal time generator 234 modifies a reference time according to a program clock reference (PCR) described in a MPEG TS packet that has been delivered in a RTP packet received via transmission-line receiving unit 21 so as to generates modified reference time. Specifically, the modified reference time is provided by subtracting the average of transmission delay time produced during the transmitting of the RTP packets from the reference time according to the PCR.

Internal time updater 235 calculates an internal time based on the modified reference time generated by internal reference time generator 234. Internal time counter 231 increments the calculated internal time according to a predetermined frequency. Reference time supplier 232 delivers the internal time of bridge device 2 generated in internal time counter 231, as modified reference time 502, to receiver devices 3 via network transmitting unit 24.

In the network system of Embodiment 2, a presentation time of real-time data may not be rewritten in transmitter device 1. Thus, the reference time may not be transmitted from bridge device 2 to transmitter device 1 in the network system of Embodiment 1 shown in FIG. 1.

In the network systems of Embodiments 1 and 2, a period during which radio communication from bridge device 2 is prohibited may be preferably determined immediately before the reference time is transmitted from bridge device 2 via wireless network 42. This prohibiting period allows the bridge device to transmit the reference time without waiting for the completion of radio communication immediately before the transmission, thus synchronizing receiver devices 3 with each other accurately. For example, in radio communication under IEEE802.11, the maximum frame length of a packet in transmission is 2,312 bytes. A time required for the transmitting of the header or data for error detection before or after the packet may be added to the prohibiting period as to determine the prohibiting time.

The wireless network systems in accordance with Embodiments 1 and 2 are preferable to a system, such as entertainment systems in an airplane and cinema complex, including plural receiver devices.

INDUSTRIAL APPLICABILITY

A network system according to the present invention allows a receiver device to output visuals and audios synchronized with each other even if including plural receiver devices, hence being preferable to a system, such as entertainment systems in an airplane and cinema complex, including plural receiver devices.

The invention claimed is:

1. A network system comprising:
 a transmitter device for transmitting real-time data containing contents data;
 a transmission line for transmitting the real-time data transmitted from the transmitter device;
 a bridge device for receiving the real-time data transmitted via the transmission line;
 a wireless network for transmitting the data transmitted from the bridge device; and
 a receiver device for receiving the data transmitted via the wireless network from the transmitter device,
 wherein the bridge device includes
  a transmission-line receiving unit for receiving the real-time data transmitted via the transmission line,
  a reference time generator for generating a reference time independently from the transmitter device, and
  a network transmitting unit for transmitting, via the wireless network, the reference time and the real-time data received by the transmission-line receiving unit, and
 wherein the receiver device includes
  a first network receiving unit for receiving the real-time data and the reference time transmitted via the wireless network from the bridge device, a first internal time controller for generating an internal time based on the reference time received by the first network receiving unit, and a real-time data processor for decoding the real-time data received by the first network receiving unit as to reproduce the contents data, and outputting the reproduced contents data based on the internal time generated by the internal time controller.

2. The network system of claim 1, wherein the transmitter device includes a second network receiving unit for receiving the reference time transmitted via the wireless network from the bridge device, a second internal time controller for generating an internal time based on the reference time received by the second network receiving unit, a transmission-line transmitting unit for transmitting the real-time data via the transmission line, and a controller for generating the real-time data from original real-time data and the internal time generated by the second internal time controller, the original real-time data containing the contents data.

3. A bridge device adapted to be used in a network system, the network system including a transmitter device for transmitting real-time data containing contents data, a transmission line for transmitting the real-time data transmitted from the transmitter device, a wireless network, and a receiver device for receiving data transmitted via the wireless network, said bridge device comprising:

a transmission-line receiving unit for receiving the real-time data transmitted via the transmission line;

a reference time generator for generating a reference time independently from the transmitter device; and a network transmitting unit for transmitting the reference time and the real-time data received by the transmission-line receiving unit via the wireless network.

4. A receiver device adapted to be used in a network system, the network system including a device for transmitting real-time data containing contents data and reference time, and a wireless network for transmitting data transmitted from the device, said receiver device comprising:

a network receiving unit for receiving the real-time data and the reference time transmitted via the wireless network from the device;

an internal time controller for generating an internal time based on the reference time received by the network receiving unit; and a real-time data processor for decoding the real-rime data received by the network receiving unit as to reproduce the contents data, and for outputting the reproduced contents data based on the internal time generated by the internal time controller.

5. A transmitter device adapted to be used in a network system, the network system including a transmission line, a device connected to the transmission line, the device generating a reference time, and a wireless network for transmitting data transmitted from the device, said transmitter device comprising:

a network receiving unit for receiving the reference time transmitted via the wireless network from the device;

an internal time controller for generating an internal time based on the reference time received by the network receiving unit;

a transmission-line transmitting unit for transmitting real-time data via the transmission line; and a controller for generating the real-time data from original real-time data and the internal time generated by the internal time controller.

6. A network system comprising:

a transmitter device for transmitting real-time data, the real-time data containing contents data and a first reference time;

a transmission line for transmitting the real-time data transmitted from the transmitter device;

a bridge device for receiving the real-time data transmitted via the transmission line;

a wireless network for transmitting data transmitted from the bridge device; and a receiver device for receiving data transmitted via the wireless network, wherein, the bridge device includes a transmission-line receiving unit for receiving the real-time data transmitted via the transmission line, a reference time generator for extracting the first reference time from the real-time data received by the transmission-line receiving unit, and for generating a second reference time from the first reference time, and a network transmitting unit for transmitting, via the wireless network, the second reference time and the real-time data received by the transmission-line receiving unit, and wherein, the receiver device includes a network receiving unit for receiving the real-time data and the second reference time transmitted via the wireless network from the bridge device, a first internal time controller for generating an internal time from the received second reference time, and a real-time data processor for decoding the real-time data received by the network receiving unit as to reproduce the contents data, and outputting the reproduced contents data based on the internal time generated by the internal time controller.

7. A bridge device adapted to be used in a network system which includes a transmitter device for transmitting real-time data including contents data and a first reference time, a transmission line for transmitting the real-time data transmitted from the transmitter device, a wireless network, and a receiver device for receiving data transmitted via the wireless network, said bridge device comprising:

a transmission-line receiving unit for receiving the real-time data transmitted via the transmission line;

a reference time generator for extracting the first reference time from the real-time data received by the transmission-line receiving unit, and generating a second reference time from the first reference time; and a network transmitting unit for transmitting, via the wireless network, the real-time data received by the transmission-line receiving unit and the second reference time.

* * * * *

UNITED STATES PATENT AND TRADEMARK OFFICE
CERTIFICATE OF CORRECTION

PATENT NO.      : 7,567,546 B2
APPLICATION NO. : 10/577770
DATED           : July 28, 2009
INVENTOR(S)     : Yusuke Kushiki et al.

Page 1 of 1

It is certified that error appears in the above-identified patent and that said Letters Patent is hereby corrected as shown below:

Title page item 57, delete the entire Abstract and replace with the following Abstract:

-- A network system includes a transmitter device, a transmission line, a bridge device for receiving real-time data, a wireless network, and a receiver device for receiving data transmitted via the wireless network. The bridge device includes a reference time generator for generating a reference time independently from the transmitter device, and a network transmitting unit for transmitting, via the wireless network, the reference time and real-time data received from the transmitter device. The receiver device includes a first network receiving unit for receiving the real-time data and the reference time transmitted via the wireless network, a first internal time controller for generating an internal time based on the reference time received by the first network receiving unit, and a real-time data processor for decoding the real-time data received by the first network receiving unit as to reproduce the contents data, and outputting the reproduced contents data based on the internal time generated by the internal time controller. This network system allows the receiver device to output visuals and audios synchronized with each other even if including plural receiver devices. --

Signed and Sealed this

Sixth Day of October, 2009

David J. Kappos
*Director of the United States Patent and Trademark Office*